United States Patent Office 3,399,528
Patented Sept. 3, 1968

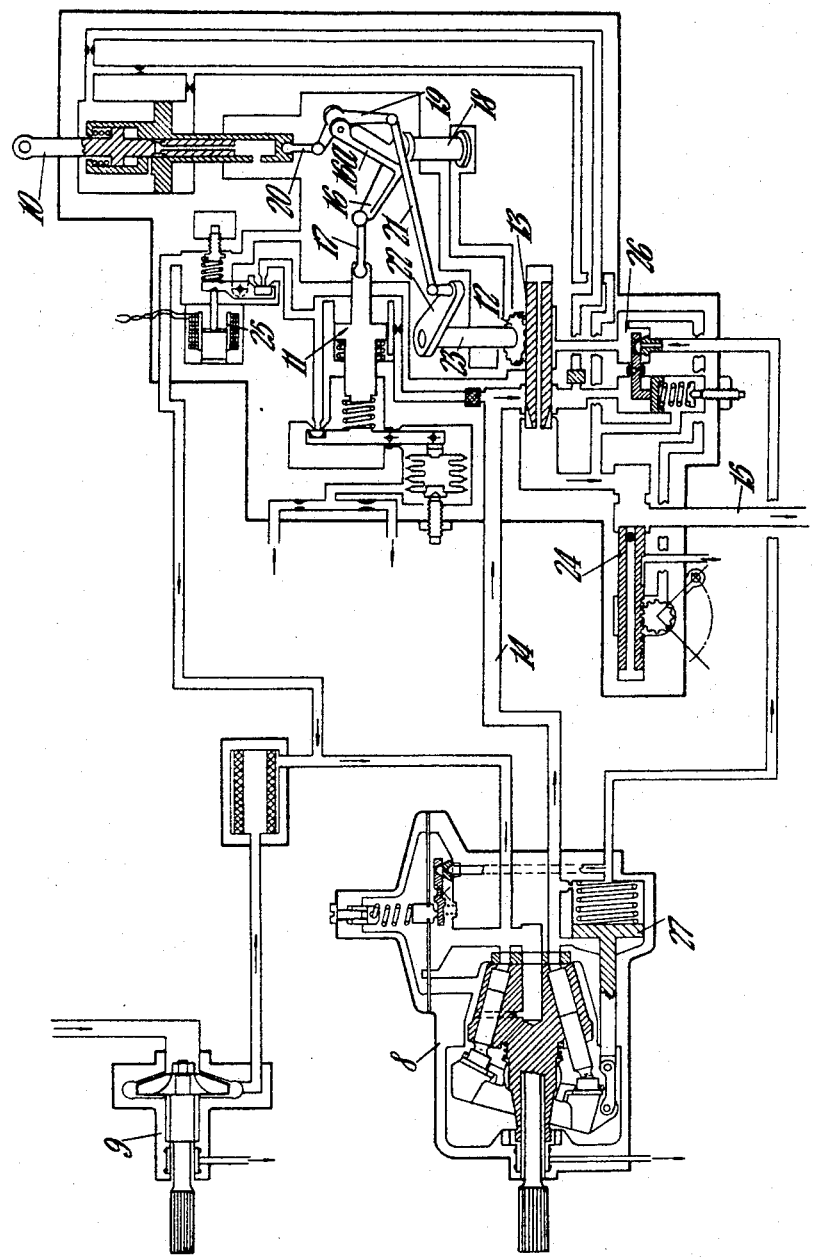

3,399,528
CONTROL LINKAGES
Eugene Harold Warne, Solihull, England, assignor to Joseph Lucas (Industries) Limited, Birmingham, England
Filed Dec. 30, 1966, Ser. No. 606,161
2 Claims. (Cl. 60—39.28)

ABSTRACT OF THE DISCLOSURE

This invention relates to linkages for the control of apparatus and of the kind in which there are first and second input members arranged to be capable of actuating a single output member.

---

The object of the invention is to provide a linkage of the kind specified in a convenient form.

In accordance with this invention a linkage comprises first and second input members, the first input member being angularly movable about a relatively fixed axis, a lever pivotally connected at a position intermediate its ends to an extension of the first input member at a position removed from said fixed axis, one end of said lever comprising the second input member and the other end being connected through a universal joint with one end of a link, the opposite end of which is connected through a universal joint to an output member, the linkage being so constructed that, the universal joint at said one end of the link can be moved in response to movement of the second input member to a first position in which the axis of that universal joint coincides with that of the fixed axis, in which position angular movement of the first input member transmits no corresponding movement to the output member, and the linkage also being so constructed that the universal joint at said opposite end of the link can be moved in response to movement of the first input member to a second position in which that universal joint axis is coincident with the axis of the pivotal connection between the first input member and the lever, in which position movement of the second input member transmits no movement to the output member.

One example of the invention will now be described with reference to the accompanying drawing which illustrates a fuel system for a gas turbine engine.

The system includes a pump 8 for delivering fuel to the engine, the pump 8 being supplied through a boost pump 9. The system also includes a primarily manually operable control indicated at 10 and a further control which is operated in response to changes in pressures derived from the engine. The latter control, details of which form no part of this invention, is indicated generally at 11. Through the linkage which forms the subject of this invention, the controls 10, 11 are arranged to actuate a pinion 12 engaging with a rack formed on a throttle member 13 which controls the flow of fuel to the engine from outlet passage 14 from the pump 8 to the passage 15.

There is also a shut off cock 24 in the passage 15, and a device 25 for modifying the response of the control 11 to pressure in accordance with temperature changes in the engine, the device 25 being electromagnetic. Apparatus indicated generally at 26 is arranged to control the pump through its servo mechanism indicated at 27.

The linkage itself comprises a first input member 16 connected through a universally jointed member 17 with the control 11. The first input member 16 is mounted on a relatively fixed pivot pin 18 and has an extension 16a extending over the axis of the pin 18. At the free end of the extension 16a and journalled about an axis extending transversely to the fixed axis of the pin 18, though not intersecting this axis, is a bell crank lever 19. One arm of this lever 19, which constitutes a second input member, disposed on one side of its pivot is connected to the control 10 through a universally jointed member 20, whilst the other arm carries at its end a universal joint which is connected to one end of a link 21. The opposite end of this link 21 is connected through a universal joint to an output member 22 mounted on a spindle 23 to the opposite end of which the pinion 12 is secured.

In use, movement of the control 10 normally transmits movement to the throttle member 13 through the second input member (formed by the bell crank lever 19), the link 21, the output member 22, and the spindle 23 and pinion 12. It is, however, possible for the linkage to reach a position in response to movement of the first input member, in which movement of the second input member 19 has no effect upon the output member 22. This position is reached when the axis of the universal joint between the link 21 and the output member 22 coincides with the axis of the pivotal connection between the extension 16a and the bell crank lever 19. This position is shown in the drawing.

Furthermore movement of the control 11 normally moves the throttle member 13 through the first input member 16, the lever 19, the link 21, the output member 22 and the spindle 23 and pinion 12. There is however a further position, which can be reached by movement of the control 10, in which movement of the second input member 19 has no effect upon the output member 22. This position is reached when the axis of the universal joint between the lever 19 and the link 21 is coincident with the fixed axis of the pin 18.

It will be clear that when in neither of these positions, the linkage will be such that either control will move the throttle member 13, though the ratios of the movements will depend upon the proximity or otherwise of the linkage to either of the positions described.

It will be apparent that the linkage can be used for other apparatus where similar requirements exist.

Having thus described my invention what I claim as new and desire to secure by Letters Patent is:

1. A linkage comprising first and second input members, the first input member being angularly movable about a relatively fixed axis, a lever pivotally connected at a position intermediate its ends to an extension of the first input member at a position removed from said fixed axis, one end of said lever comprising the second input member and the other end benig connected through a universal joint with one end of a link, the opposite end of which is connected through a universal joint to an output member, the linkage being so constructed that the universal joint at said one end of the link can be moved in response to movement of the second input member to a first position in which the axis of that universal joint coincides with that of the fixed axis, in which position only angular movement of the second input member transmits corresponding movement to the output member, and the linkage also being so constructed that the universal joint at said opposite end of the link can be moved in response to movement of the first input member to a second position in which that universal joint axis is coincident with the axis of the pivotal connection between the first input member and the lever, in which position only movement of the first input member transmits movement to the output member.

2. A gas turbine engine fuel system comprising a pump for delivering fuel through a passage to the engine, a throttle disposed intermediate the ends of the passage, a manual control for said throttle and a further control which is responsive to changes in at least one parameter derived from the engine, and a linkage interconnecting the manual control and said further control with the throttle, the linkage comprising first and second input members connected to the further control and to the manual control respectively, the first input member being angularly movable about a relatively fixed axis, a lever pivotally connected at a position intermediate its ends to an extension of the first input member at a position removed from said fixed axis, one end of said lever comprising the second input member and the other end being connected through a universal joint with one end of a link, the opposite end of which is connected through a universal joint to an output member connected in turn to the throttle, the linkage being so constructed that the universal joint at said one end of the link can be moved in response to movement of the second input member to a first position in which the axis of that universal joint coincides with that of the fixed axis, in which position only angular movement of the second input member transmits corresponding movement to the output member and the throttle, and the linkage also being so constructed that the universal joint at said opposite end of the link can be moved in response to movement of the first input member to a second position in which that universal joint axis is coincident with the axis of the pivotal connection between the first input member and the lever, in which position only movement of the first input member transmits movement to the output member.

References Cited
UNITED STATES PATENTS 2,935,136   5/1960   Wall et al. _____ 60—39.28 XR JULIUS E. WEST, *Primary Examiner.*